(12) United States Patent
Brown et al.

(10) Patent No.: US 10,346,289 B2
(45) Date of Patent: Jul. 9, 2019

(54) RUN TIME WORKLOAD THRESHOLD ALERTS FOR CUSTOMER PROFILING VISUALIZATION

(71) Applicant: International Business Machines Corporation, Armonk, NY (US)

(72) Inventors: Thomas R. Brown, Hyde Park, NY (US); Thomas W. Conti, Poughkeepsie, NY (US); Kyle R. Moser, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 15/197,826

(22) Filed: Jun. 30, 2016

(65) Prior Publication Data

US 2018/0004631 A1 Jan. 4, 2018

(51) Int. Cl.
*H04L 12/24* (2006.01)
*H04L 12/26* (2006.01)
*G06F 11/36* (2006.01)

(52) U.S. Cl.
CPC ...... *G06F 11/3668* (2013.01); *G06F 11/3672* (2013.01); *H04L 41/14* (2013.01); *H04L 41/5009* (2013.01); *H04L 41/5032* (2013.01); *H04L 43/04* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 8,589,932 B2 | 11/2013 | Bower, III et al. | |
| 9,021,447 B2* | 4/2015 | Krajec | G06F 11/3636 717/128 |
| 9,210,141 B2* | 12/2015 | Anderson | H04L 9/3213 |

(Continued)

FOREIGN PATENT DOCUMENTS

WO 2013006708 A1 1/2013

OTHER PUBLICATIONS

Anonymous, "Method to Manage Analytics Data Collection of Large System Workloads" (Jan. 8, 2012) IP.com, IPCOM000241913D; 4 pgs.

(Continued)

*Primary Examiner* — Isaac T Tecklu
(74) *Attorney, Agent, or Firm* — Cantor Colburn LLP; William Kinnaman

(57) ABSTRACT

A method obtains from a database historical data values for each of a plurality of workload data points relating to a prior workload run; determines a threshold value for each of the plurality of workload data points relating to the prior workload run; obtains current data values for each of a plurality of workload data points relating to a current workload test run and corresponding to the plurality of workload data points in the historical data values; determines one or more statistical measures relating to the historical data values and the current data values; determines whether the threshold value for at least one of the plurality of data points relating to the prior workload run is not achieved in a set amount of time by the current data value of the same data point relating to the prior workload run; and provides an alert that the threshold value has not been achieved.

13 Claims, 6 Drawing Sheets

(56) References Cited

U.S. PATENT DOCUMENTS

| | | | |
|---|---|---|---|
| 2005/0149532 A1* | 7/2005 | Hubbard | G06F 7/00 |
| 2008/0005707 A1* | 1/2008 | Papanikolaou | G06F 17/5009 702/81 |
| 2012/0297238 A1* | 11/2012 | Watson | G06F 9/5088 714/4.11 |
| 2013/0110564 A1 | 5/2013 | Hyser et al. | |
| 2013/0185433 A1* | 7/2013 | Zhu | H04L 67/303 709/226 |
| 2014/0047095 A1* | 2/2014 | Breternitz | G06F 9/5072 709/224 |
| 2014/0047272 A1* | 2/2014 | Breternitz | G06F 11/3495 714/32 |
| 2014/0101475 A1 | 4/2014 | Berke et al. | |
| 2014/0258987 A1* | 9/2014 | Zhou | G06F 11/3692 717/126 |
| 2015/0161385 A1* | 6/2015 | Gounares | G06F 21/54 726/25 |
| 2016/0357660 A1* | 12/2016 | Dean | G06F 11/3692 |
| 2016/0359683 A1* | 12/2016 | Bartfai-Walcott | H04L 41/5009 |
| 2016/0381129 A1* | 12/2016 | Barsness | G06F 9/5083 709/226 |
| 2017/0315902 A1* | 11/2017 | Moretto | G06F 11/3664 |

OTHER PUBLICATIONS

Anonymous, "Simplified Threshold Adjuster for Systems Generating Notifications" (Jan. 5, 2012) IP.com, IPCOM000213916D; 5 pgs.

List of IBM Patents or Patent Applications Treated as Related (Appendix P), filed Jun. 30, 2016, 2 pages.

Thomas R. Brown, et al., Pending U.S. Appl. No. 15/197,828 Entitled "Run Time and Historical Workload Report Scores for Customer Profiling Visualization" filed with the USPTO Jun. 30, 2016.

Thomas R. Brown, et al., Pending U.S. Appl. No. 15/197,835 Entitled "Z/OS SMF/RMF Workload Data Playback with Web Dashboard Visualization" filed with the USPTO Jun. 30, 2016.

Thomas W. Conti, et al., Pending U.S. Appl. No. 15/197,827 Entitled "Run Time Test Workload Customer Profiling Baselines Visualization" filed with the USPTO Jun. 30, 2016.

Thomas W. Conti, et al., Pending U.S. Appl. No. 15/197,829 Entitled "Run Time Automatic Workload Tuning Using Customer Profiling Workload Comparison" filed Jun. 30, 2016.

Thomas W. Conti, et al., Pending U.S. Appl. No. 15/197,831 Entitled "Using Test Workload Run Facts and Problem Discovery Data as Input for Business Analytics to Determine Test Effectiveness" filed Jun. 30, 2016.

Thomas W. Conti, et al., Pending U.S. Appl. No. 15/197,833 Entitled "Run Time TPNS Workload Controls for Test Workload Tuning in Relation to Customer Profiling Workload" filed Jun. 30, 2016.

Thomas W. Conti, et al., Pending U.S. Appl. No. 15/197,843 Entitled "Visual Test Workload Execution Modeling" filed with the USPTO Jun. 30, 2016.

Thomas W. Conti, et al., Pending U.S. Appl. No. 15/197,844 Entitled "Run Time SMF/RMF Statistical Formula Methodology for Generating Enhanced Workload Data Points for Customer Profiling Visulization" filed Jun. 30, 2016.

List of IBM Patents or Patent Applications Treated as Related (Appendix P), filed Feb. 22, 2017, 2 pages.

Thomas R. Brown, et al., Pending U.S. Appl. No. 15/424,971 Entitled "Run Time Workload Threshold Alerts For Customer Profiling Visualization" filed with the USPTO Feb. 6, 2017.

Thomas R. Brown, et al., Pending U.S. Appl. No. 15/427,129 Entitled "Run Time and Historical Workload Report Scores for Customer Profiling Visualization" filed with the USPTO Feb. 8, 2017.

Thomas W. Conti, et al., Pending U.S. Appl. No. 15/424,965 Entitled "Using Customer Profiling and Analytics to Understand Customer Environment and Workload Complexity and Characteristics by Industry" filed with the USPTO Feb. 6, 2017.

Thomas W. Conti, et al., Pending U.S. Appl. No. 15/424,973 Entitled "Run Time Test Workload Customer Profiling Baselines Visualization" filed with the USPTO Feb. 6, 2017.

Thomas W. Conti, et al., Pending U.S. Appl. No. 15/427,130 Entitled "Visual Test Workload Execution Modeling" filed with the USPTO Feb. 8, 2017.

Thomas W. Conti, et al., Pending U.S. Appl. No. 15/427,135 Entitled "Run Time Automatic Workload Tuning Using Customer Profiling Workload Comparison" filed Feb. 8, 2017.

Thomas W. Conti, et al., Pending U.S. Appl. No. 15/427,137 Entitled "Using Test Workload Run Facts and Problem Discovery Data as Input for Business Analytics to Determine Test Effectiveness" filed Feb. 8, 2017.

Thomas W. Conti, et al., Pending U.S. Appl. No. 15/429,262 Entitled "Measuring and Optimizing Test Resources and Test Coverage Effectiveness Through Run Time Customer Profiling and Analytics" filed with the USPTO Feb. 10, 2017.

Thomas W. Conti, et al., Pending U.S. Appl. No. 15/429,265 Entitled "Using Run Time and Historical Customer Profiling and Analytics to Determine Customer Disaster Recovery vs Production Differences, and to Enhance Customer Disaster Recovery Readiness and Effectiveness" filed with the USPTO Feb. 10, 2017.

Thomas W. Conti, et al., Pending U.S. Appl. No. 15/429,268 Entitled "Using Workload Profiling and Analytics and Score Complexity of Test Environments and Workloads" filed with the USPTO Feb. 10, 2017.

List of IBM Patents or Patent Applications Treated as Related (Appendix P), filed Sep. 15, 2016, 2 pages.

Thomas R. Brown, et al., Pending U.S. Appl. No. 15/264,269 Entitled "Using Customer Profiling and Analytics to Create a Relative, Targeted, and Impactful Customer Profiling Environment/Workload Questionnaire" filed with the USPTO Sep. 14, 2016.

Thomas W. Conti, et al., Pending U.S. Appl. No. 15/259,094 Entitled "Z/OS SMF Record Navigation Visualization Tooling" filed with the USPTO Sep. 8, 2016.

Thomas W. Conti, et al., Pending U.S. Appl. No. 15/259,099 Entitled "Measuring and Optimizing Test Resources and Test Coverage Effectiveness Through Run Time Customer Profiling and Analytics" filed with the USPTO Sep. 8, 2016.

Thomas W. Conti, et al., Pending U.S. Appl. No. 15/259,104 Entitled "Using Customer Profiling and Analytics to Understand, Rank, Score, and Visualize Best Practices" filed with the USPTO Sep. 14, 2016.

Thomas W. Conti, et al., Pending U.S. Appl. No. 15/259,107 entitled "Using Best Practices Customer Adoption Business Intellegence Data as Input to Enterprise Resource Planning (ERP)" filed with the USPTO Sep. 8, 2016.

Thomas W. Conti, et al., Pending U.S. Appl. No. 15/259,110 Entitled "Using Run Time and Historical Customer Profiling and Analytics to Determine Customer Test vs. Production Differences, and to Enhance Customer Test Effectiveness" filed with the USPTO Sep. 8, 2016.

Thomas W. Conti, et al., Pending U.S. Appl. No. 15/259,115 Entitled "Using Run Time and Historical Customer Profiling and Analytics to Determine Customer Disaster Recovery vs Production Differences, and to Enhance Customer Disaster Recovery Readiness and Effectiveness" filed with the USPTO Sep. 8, 2016.

Thomas W. Conti, et al., Pending U.S. Appl. No. 15/259,120 Entitled "Determining if Customer Characteristics by Customer Gography, Country, Culture or Industry May Be Further Applicable to a Wilder Customer Set" filed with the USPTO Sep. 8, 2016.

Thomas W. Conti, et al., Pending U.S. Appl. No. 15/259,122 Entitled "Using Customer and Workload Profiling and Analytics to Determine Score, and Report Portability of Customer and Test Environments and Workloads" filed with the USPTO Sep. 8, 2016.

Thomas W. Conti, et al., Pending U.S. Appl. No. 15/259,124 Entitled "Using Customer Profiling and Analytics to Understand

(56) References Cited

OTHER PUBLICATIONS

Customer Workload Complexity and Characteristics by Customer Geography, Country, and Cuture" filed with the USPTO Sep. 8, 2016.

Thomas W. Conti, et al., Pending U.S. Appl. No. 15/259,130 Entitled "Using Workload Profiling and Analytics and Score Complexity of Test Environments and Workloads" filed with the USPTO Sep. 8, 2016.

Thomas W. Conti, et al., Pending U.S. Appl. No. 15/259,168 Entitled "Using Customer Profiling and Analytics to Understand Customer Environment and Workload Complexity and Characteristics by Industry" filed with the USPTO Sep. 8, 2016.

Thomas W. Conti, et al., Pending U.S. Appl. No. 15/264,630 Entitled "Using Customer Workload Profiling and Analytics to understand and Visualize Customer Workload Execution" filed with the USPTO Sep. 14, 2016.

Thomas W. Conti, et al., Pending U.S. Appl. No. 15/264,631 Entitled "Using Run Time and Historical Customer Profiling and Analytics to Iteratively Design, Develop, Test, Tune, and Maintain a Customer-Like Test Workload" filed Nith the USPTO Sep. 14, 2016.

Thomas W. Conti, et al., Pending U.S. Appl. No. 15/264,632 Entitled "Using Customer Profiling and Analytics to More Accurately Estimate and Generate and Agile Bill of Requirements and Sprints for Customer or Test Workload Port" filed with the USPTO Sep. 14, 2016.

Thomas W. Conti, et al., Pending U.S. Appl. No. 15/264,634 Entitled "Standardizing Run-Time and Historical Customer and Test Environments and Workloads Comparisons Using Specific Sets of Key Platform Data Points" filed with the USPTO Sep. 14, 2016.

Thomas W. Conti, et al., Pending U.S. Appl. No. 15/264,638 Entitled "Using Run-Time and Historical Customer Profiling and Analytics to Determine and Score Customer Adoption Levels of Platform Technologies" filed with the USPTO Sep. 14, 2016.

Thomas W. Conti, et al., Pending U.S. Appl. No. 15/264,639 Entitled "Standardizing Customer and Test Data and Information Collection for Runtime and Historical Profiling Environments and Workload Comparisons" filed with the USPTO Sep. 14, 2016.

Musabbir, S., et al., "RPO: Runtime Web Server Optimization Under Simultaneous Multithreading" (2013) IFIP/IEEE International Symposium on Integrated Network Management (IM2013) pp. 85-92.

* cited by examiner

RUN TIME WORKLOAD THRESHOLD ALERTS FOR CUSTOMER PROFILING VISUALIZATION

BACKGROUND

The present invention relates to the testing of software, and more specifically, to a method, system and computer program product that implement aspects of workload and operational profiling, thereby resulting in improvements in the testing of customer software.

In the field of software testing, as in many other technical fields, improvements are constantly being sought, primarily for cost and accuracy reasons. A fundamental goal of software testing in theory is to identify all of the problems in a customer's software program before the program is released for use by the customer. However, in reality this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes obtaining, by a processor, from a database historical data values for each of a plurality of workload data points relating to a prior workload run; and determining, by the processor, a threshold value for each of the plurality of workload data points relating to the prior workload run. The method also includes obtaining, by the processor, current data values for each of a plurality of workload data points relating to a current workload test run and corresponding to the plurality of workload data points in the historical data values; and determining, by the processor, one or more statistical measures relating to the historical data values and the current data values. The method further includes determining, by the processor, whether the threshold value for at least one of the plurality of data points relating to the prior workload run is not achieved in a set amount of time by the current data value corresponding to the same one of the at least one of the plurality of data points relating to the prior workload test run; and providing, by the processor, an alert that the threshold value has not been achieved.

According to another embodiment of the present invention, a system includes a processor in communication with one or more types of memory, the processor configured to obtain from a database historical data values for each of a plurality of workload data points relating to a prior workload run; and to determine a threshold value for each of the plurality of workload data points relating to the prior workload run. The processor is also configured obtain current data values for each of a plurality of workload data points relating to a current workload test run and corresponding to the plurality of workload data points in the historical data values, and to determine one or more statistical measures relating to the historical data values and the current data values. The processor is further configured to determine whether the threshold value for at least one of the plurality of data points relating to the prior workload run is not achieved in a set amount of time by the current data value corresponding to the same one of the at least one of the plurality of data points relating to the prior workload run, and to provide an alert that the threshold value has not been achieved.

According to yet another embodiment of the present invention, a computer program product includes a non-transitory storage medium readable by a processing circuit and storing instructions for execution by the processing circuit for performing a method that includes obtaining, by a processor, from a database historical data values for each of a plurality of workload data points relating to a prior workload run; and determining, by the processor, a threshold value for each of the plurality of workload data points relating to the prior workload run. The method also includes obtaining, by the processor, current data values for each of a plurality of workload data points relating to a current workload test run and corresponding to the plurality of workload data points in the historical data values; and determining, by the processor, one or more statistical measures relating to the historical data values and the current data values. The method further includes determining, by the processor, whether the threshold value for at least one of the plurality of data points relating to the prior workload run is not achieved in a set amount of time by the current data value corresponding to the same one of the at least one of the plurality of data points relating to the prior workload run; and providing, by the processor, an alert that the threshold value has not been achieved.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
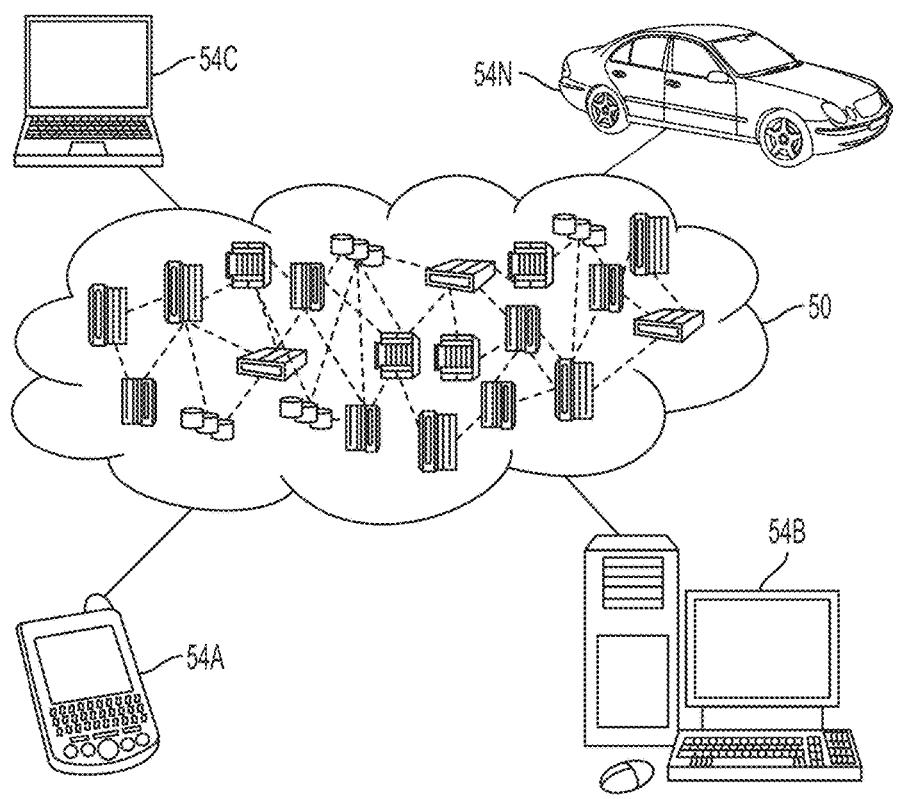
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
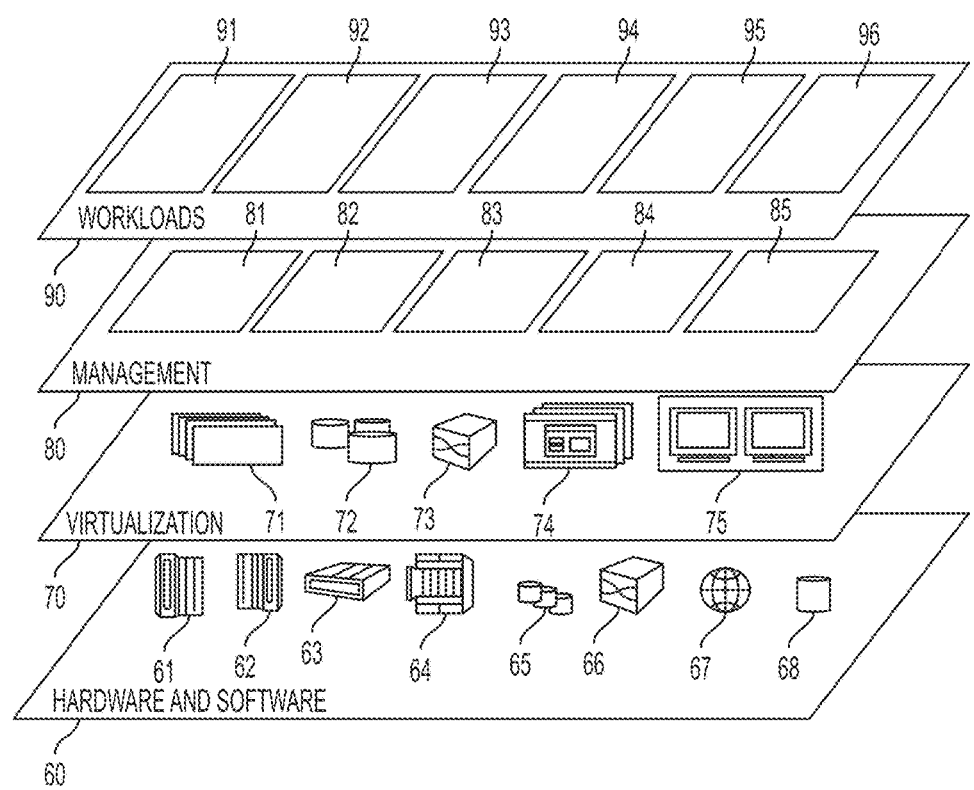
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for comparing historical customer workload run data with active test workload run data, and for providing an alert when a data value that results from the comparison achieves a predetermined threshold value, in accordance with one or more embodiments of the present invention.

Figure 3:
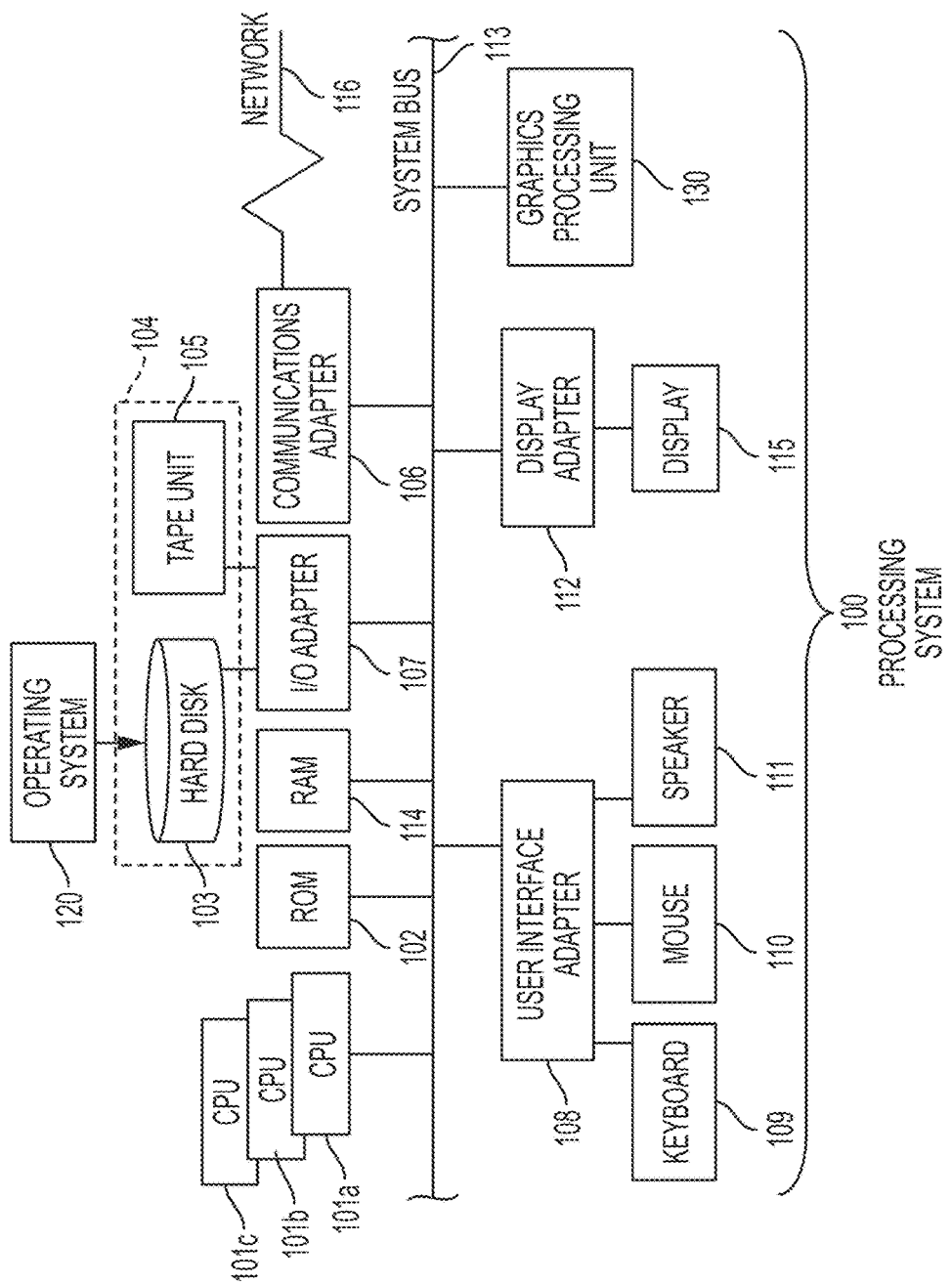
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for comparing historical customer workload run data with active test workload run data, and for providing an alert when a data value that results from the comparison achieves a predetermined threshold value.

One or more embodiments of the present invention provide automated run time test workload threshold alert functionality when comparing historical customer workload run data to active or current test workload run data. This added functionality provides automated threshold alert notifications for targeted workload run components, as specified by the test workload user or operator.

In software testing, valuable unattended test time can be wasted when a test workload and system are not performing in a manner that is convergent with historical customer activity. In exemplary embodiments of the present invention, workload convergence issues as well as any other workload and system issues can be alerted to the tester so that remediation can occur in real time.

Thus, one or more embodiments of the present invention provide for threshold alerts that can be met by a combination of simple to complex conditions, relationships, and/or formulas of data points ("DPs"), analysis points ("APs"), analysis point categories ("APCs"), analysis point groups ("APGs"), and workload feedback data. These are common types of data in software workload run testing. As such, a relatively wide range of information can be conveyed in the alert to the user.

In other embodiments, a customer profiling baselines visualization web application or dashboard may utilize existing customer workload run data coupled with the live collection of test workload run data, with the data being stored in a database. The data may be used in a web application to visually represent the levels of load and stress along with the ratios of activity for sets of related data points.

As an additional, integrated feature of this customer profiling baselines visualization web application, highly customizable threshold alerts (including a wide range of threshold criteria) may be configured at the individual data point level, and/or for sets of related data points. Threshold alert criteria can be saved in a database and retrieved for later use. Negative and/or positive thresholds may be specified for these individual or grouped data points.

In one or more embodiments of the present invention, various alert methods may include web application based visual and audio alerts, as well as mobile alert (text, email, etc.) capabilities. Alert types can range from basic high level to detailed information.

One or more embodiments of the present invention provide for automated, run time test workload threshold alert notification using a diverse and multi-faceted set of test user specified conditions, and delivered through a variety of audio, visual, and mobile technologies, all without the need for the test user or operator to actively monitor the test workload being run. Threshold alerts may be performed at run time occurrence of the targeted workload activity or conditions, solving the problem of continuously monitoring the health or effectiveness of a workload as it executes and adjusting the workload appropriately, as opposed to some potentially significant time later in the workload run or even during post-workload run analysis.

Given that test workload runs can be complicated to stage, configure and run, and can span multiple days or even weeks including non-user monitored off-shift and weekend time, providing a mobile alert capability for any number of key workload indicators can result in much more cost effective use of limited availability and expensive test systems.

This threshold alert notification functionality in accordance with one or more embodiments of the present invention provides multiple capabilities, efficiencies, and financial benefits for the test user or operator including: to be alerted when any of a variety of test user specified thresholds are met for individual and/or sets of data points; to understand the effectiveness of the workload run (software, hardware, firmware) at run time; to tune test workloads much closer to their intended goal through the very nature of faster, run time notification and awareness. Intended goals may include emulating key characteristics of a client workload environment or a test recreation or replication; to significantly reduce the amount of limited and high value operating system systems, storage, network, environmental, personnel time and resources to accomplish test objectives, resulting in both financial savings and reduced environmental impact; and to increase test plan efficiency through expanded test coverage, resulting in enhanced product quality and greater customer satisfaction. By the reduction of repeat test workload runs through higher individual workload run effectiveness, the test user/operator can run additional and/or expanded test cases/scenarios.

Figure 4:
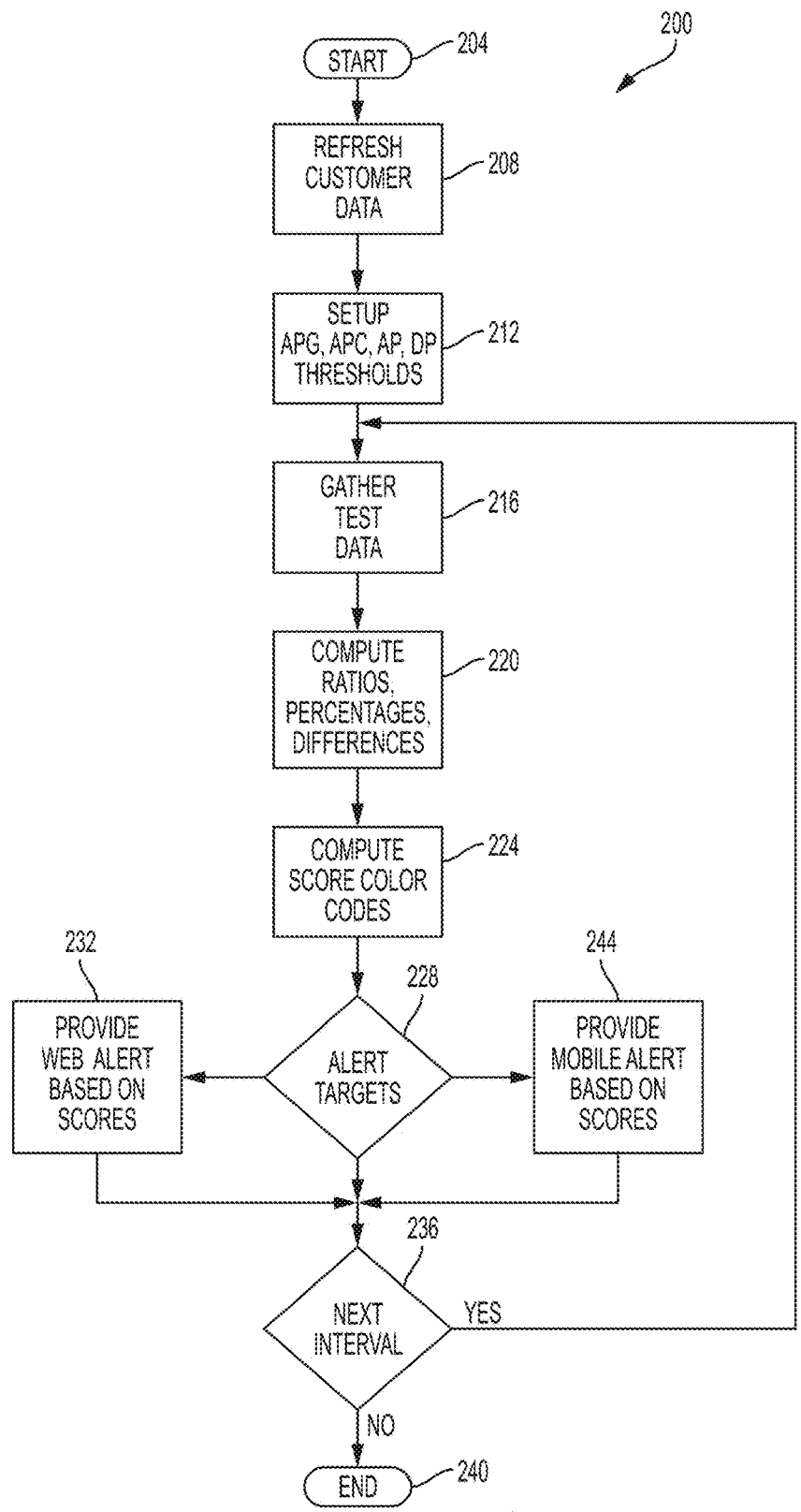
FIG. 4 is a flow diagram of a method for comparing historical customer workload run data with active test workload run data, and for providing an alert when a data value that results from the comparison achieves a predetermined threshold value, in accordance with one or more embodiments of the present invention.

With reference now to FIG. 4, a flow diagram illustrates a method 200 according to one or more embodiments of the present invention for comparing historical customer workload run data with active test workload run data, and for providing an alert when a data value that results from the comparison achieves a predetermined threshold value.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

Figure 5:
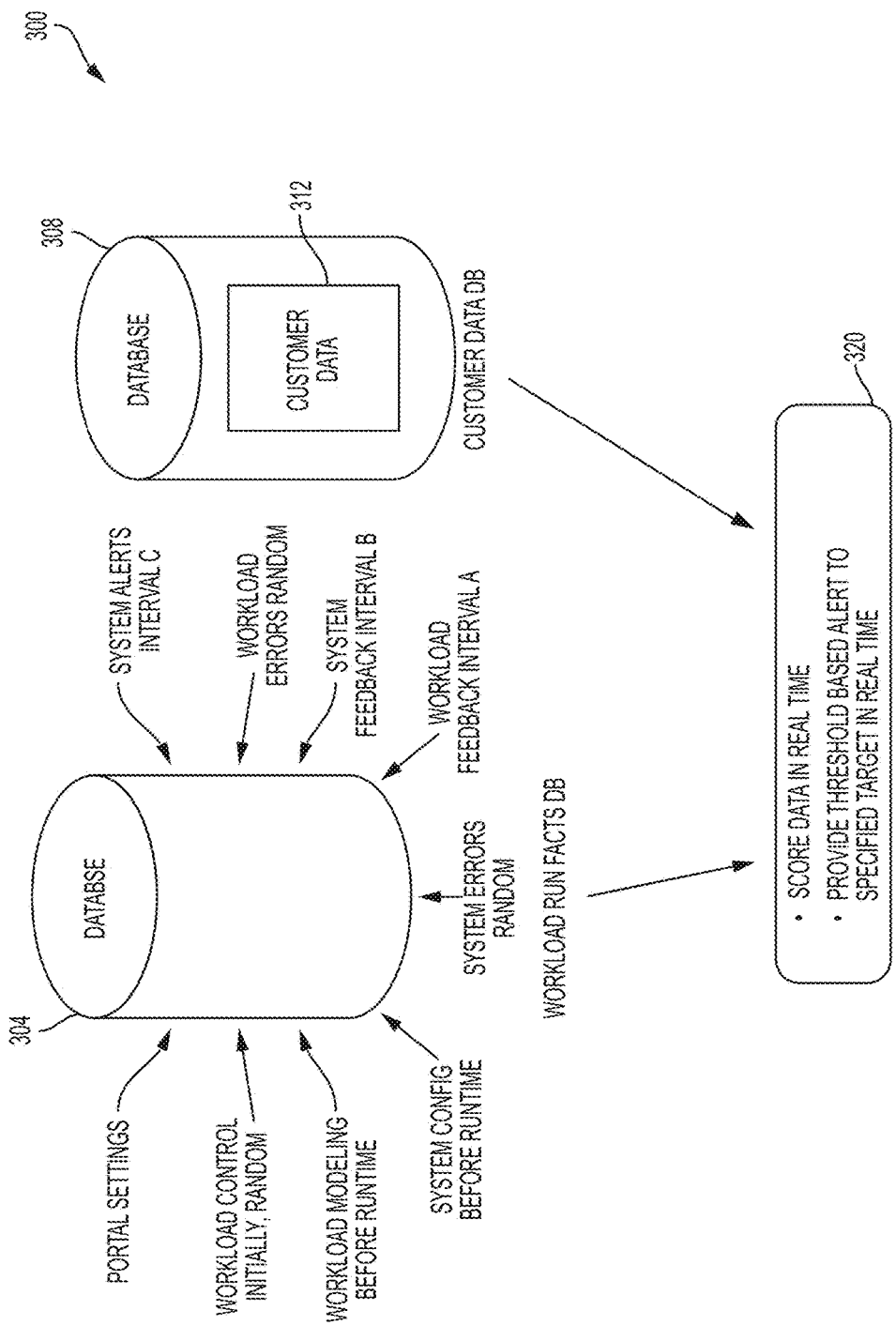
FIG. 5 is a block diagram of a system having two databases that store various types of data for use with the method of FIG. 4, in accordance with one or more embodiments of the present invention.

Referring to FIG. 5, there illustrated is a block diagram of a system 300 having two databases 304, 308 that store various types of data (e.g., customer data 312 in database 308) for use with the method of FIG. 4, in accordance with one or more embodiments of the present invention.

The method 200 begins in a block 204, followed by a block 208 in which an operation is performed whereby various types of archived or historical customer workload run data is refreshed. This historical data may be stored or archived in the database 308 (FIG. 5).

In block 212, an operation is performed which sets a threshold value for each one of various data types whose values are desired to be observed during a run time test procedure of customer software. As mentioned hereinabove, common types of workload run testing include data points ("DPs"), analysis points ("APs"), analysis point categories ("APCs"), analysis point groups ("APGs"), and workload feedback data.

In block 216, an operation is performed which gathers or obtains the then-current values for the corresponding data points in block 212 above as the workload test is running. These real time test data points may be stored in the workload run facts database 304 of FIG. 5.

In block 220, an operation is performed in which various statistical measures for the data points are determined, calculated or computed. These statistical measures may include, for example, ratios, percentages, differences, and other types of mathematical operations designed to compare and contrast two values of the same data point.

Figure 6:
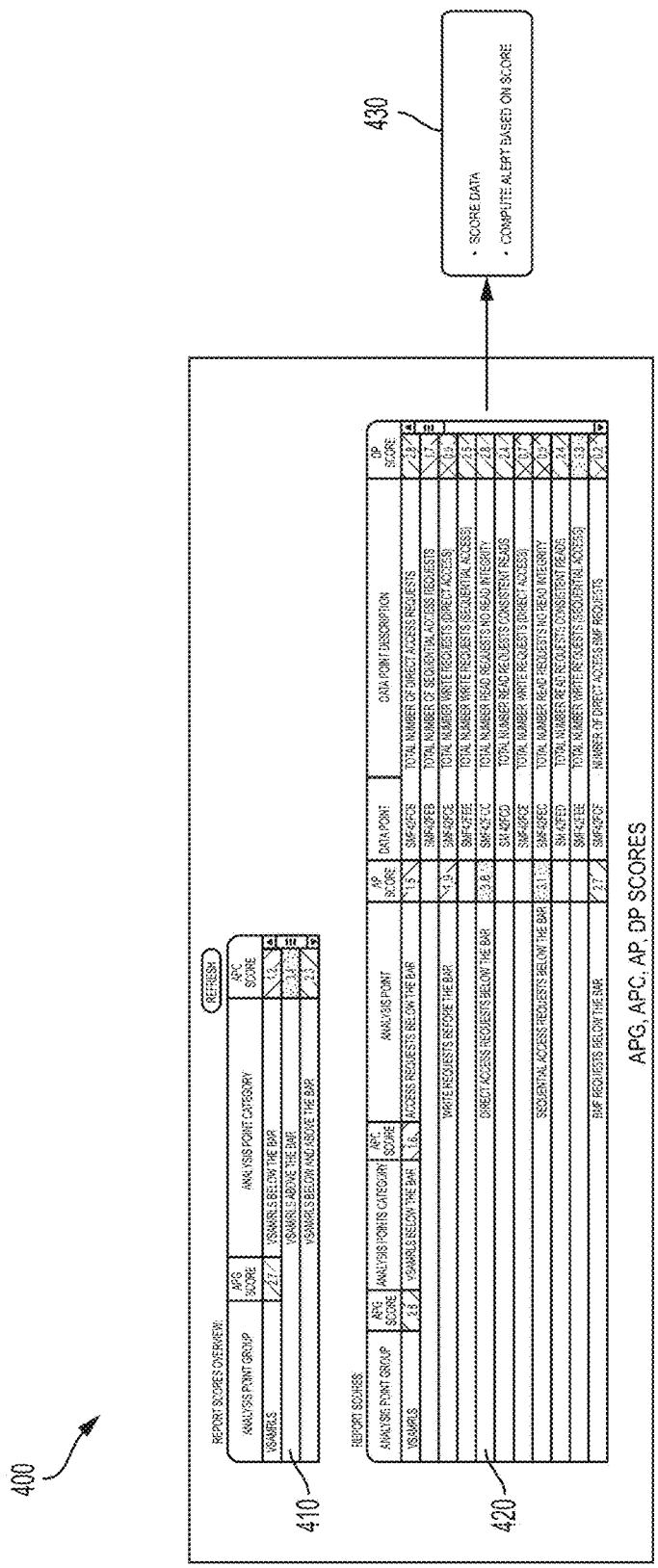
FIG. 6 is a diagram of a screen display that visually displays various types of workload run data scores and alerts using various colors and other visual indicators, in accordance with one or more embodiments of the present invention.

Referring also to FIG. 6, there illustrated is a diagram of a screen display 400 that visually displays various exemplary types of workload run data scores and alerts using various colors and other visual indicators, in accordance with one or more embodiments of the present invention.

In block 224, an operation is performed which determines, calculates or computes various color codes for the statistical measures determined in block 220 hereinabove. See also block 430 in FIG. 6. These color codes may vary by whether a threshold for a data point has been reached, is close to being reached, or is relatively far from being reached. As such, the color codes may indicate an alert to the user that a threshold for each of one or data points has been reached.

In block 228, an operation is performed which determines the type of alert to provide to the user in real time. As discussed herein, the alerts can vary between audio and visual alerts, with each type of alert having various alternatives. For example the display 400 of FIG. 6 depicts various items of visual information, including alert status for various data points using, e.g., various different colors (as indicated in FIG. 6 by various different types of stiplings). This visual information is depicted, for example, in a "Report Scores Overview" 410 area or a "Report Scores" 420 area.

In the alternative, a mobile threshold alert 244 may be provided in real time to a user on their mobile device, such as, for example, a personal digital assistant (PDA) or cellular telephone or smartphone 54A, or desktop computer 54B, as shown in FIG. 1. See also block 320 in FIG. 5. Also, a web alert 232 may be provided to a user on a computer or processing device.

After the alert information has been provided to the user, a block 236 includes an operation which checks if a next test interval is occurring or about to occur. If not, the method ends in block 240. If so, the method 200 goes to block 216 which gathers test data and the method 200 proceeds accordingly, as previously described hereinabove.

Embodiments of the present invention provide an enhanced level of efficiency, which can lead to secondary benefits such as cost reductions and optimization within many aspects or levels of a software test organization.

Include the capability to alert the user when specific run time test threshold conditions occur for a wide variety of targeted customer workload activities or conditions, without the primary focus being on data center workload cost reduction.

This relatively wide range of targeted workload activity or conditions can include when the workload is deficient, equivalent, and/or superior to any of a wide range of historical customer and/or test workload characteristics, and not just when specific utilization thresholds are met. These customer and/or test workload characteristics can measure from the smallest workload component to the entire system, and can comprise individual data points, groups of data points, formulas, calculations, etc. at the application, workload, and/or system levels.

Threshold alerts can be used for different types of test case notification, including automated and/or manual actions, which may include stopping the workload and/or the test case; data collection including more accurate and comprehensive first failure data capture; observation without any action taken; and observation with appropriate action taken, for example, recovery, workload increase or decrease, error injection, etc.

Using a relational database to retain a comprehensive list of workload run facts, including threshold alerts, statistics and/or analytics may be run against the alerts to determine how efficient and accurate the individual and collective workload runs are in relation to the end goal. The relatively more efficient workloads can then be used for future test workload run planning for continual test efficiency improvements.

Examples of the audio and video threshold alerts in accordance with embodiments of the present invention include a relatively wide range of diverse audio alerts which can be helpful in lab, control center, factory, field, office, home and other environments for operators, testers, end users, etc. The audio alerts can include the wide range of National Language Support ("NLS") spoken in the language chosen or specified by the individual end user. The audio alerts can also include a relatively wide range of sound effects, volumes, emphasis, and customizations as specified by the individual end user.

Also, a relatively wide range of diverse visual alerts are contemplated by one or more embodiments of the present invention. These visual alerts may be helpful in the lab, control center, factory, field, office, home and other environments for operators, testers, end users, etc. The visual alerts can include a multitude of colors, special effects, avatars, etc. as chosen or specified by the individual end user.

Further, a relatively wide range of diverse audio and visual alert combinations may be integrated into a customer workload and environment profiling visualization dashboard.

Exemplary embodiments may also include database retention of the customized end user specified audio and visual alerts for future reference, configuration, use, updates, analytics, and cognitive learning.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
 a processor in communication with one or more types of memory, the processor configured to:
  obtain from a database historical data values for each of a plurality of workload data points relating to a prior workload run;
  determine a threshold value for each of the plurality of workload data points relating to the prior workload run;
  obtain current data values for each of a plurality of workload data points relating to a current workload test run and corresponding to the plurality of workload data points in the historical data values;
  determine one or more statistical measures relating to the historical data values and the current data values;

determine whether the threshold value for at least one of the plurality of data points relating to the prior workload run is not achieved in a set amount of time by the current data value corresponding to the same one of the at least one of the plurality of data points relating to the prior workload run; and provide, while the current workload test is being run, an alert that the threshold value has not been achieved, wherein the alert provided is an audio alert or a visual alert via a mobile device or computer.

2. The system of claim 1 wherein the one or more statistical measures is selected form the group consisting or ratios, percentages and differences.

3. The system of claim 1 wherein the processor configured to determine one or more statistical measures relating to the historical data values and the current data values comprises the processor configured to determine one or more scores that are provided in colors on a visual display.

4. The system of claim 1 wherein the plurality of workload data points in the historical data values is selected from the groups consisting of data points, analysis points, analysis point categories, and analysis point groups.

5. The system of claim 1 wherein the alert is selected from the group consisting of an audio alert and a visual alert, and wherein the audio alert and the visual alert are provided on a mobile device.

6. The system of claim 1 wherein the alert comprises a visual alert provided on a display screen.

7. A computer program product comprising:
a non-transitory storage medium readable by a processing circuit and storing instructions for execution by the processing circuit for performing a method comprising:
obtaining, by a processor, from a database historical data values for each of a plurality of workload data points relating to a prior workload run;
determining, by the processor, a threshold value for each of the plurality of workload data points relating to the prior workload run;
obtaining, by the processor, current data values for each of a plurality of workload data points relating to a current workload test run and corresponding to the plurality of workload data points in the historical data values;
determining, by the processor, one or more statistical measures relating to the historical data values and the current data values;
determining, by the processor, whether the threshold value for at least one of the plurality of data points relating to the prior workload run is not achieved in a set amount of time by the current data value corresponding to the same one of the at least one of the plurality of data points relating to the prior workload run; and
providing, by the processor while the current workload test is being run, an alert that the threshold value has not been achieved, wherein the alert provided is an audio alert or a visual alert via a mobile device or computer.

8. The computer program product of claim 7 wherein the one or more statistical measures is selected form the group consisting or ratios, percentages and differences.

9. The computer program product of claim 7 wherein determining, by the processor, one or more statistical measures relating to the historical data values and the current data values comprises determining, by the processor, one or more scores that are provided in colors on a visual display.

10. The computer program product of claim 7 wherein the plurality of workload data points in the historical data values is selected from the groups consisting of data points, analysis points, analysis point categories, and analysis point groups.

11. The computer program product of claim 7 wherein the alert is selected from the group consisting of an audio alert and a visual alert, and wherein the audio alert and the visual alert are provided on a mobile device.

12. The system of claim 1 wherein the processor is further operable to determine an alert type to provide via the mobile device or computer.

13. The computer program product of claim 7 further comprising determining an alert type to provide via the mobile device or computer.

* * * * *